A. G. LAVERTINE.
FISHING REEL.
APPLICATION FILED JAN. 27, 1914.

1,123,764.

Patented Jan. 5, 1915.
3 SHEETS—SHEET 1.

A. G. LAVERTINE.
FISHING REEL.
APPLICATION FILED JAN. 27, 1914.

1,123,764.

Patented Jan. 5, 1915.
3 SHEETS—SHEET 2.

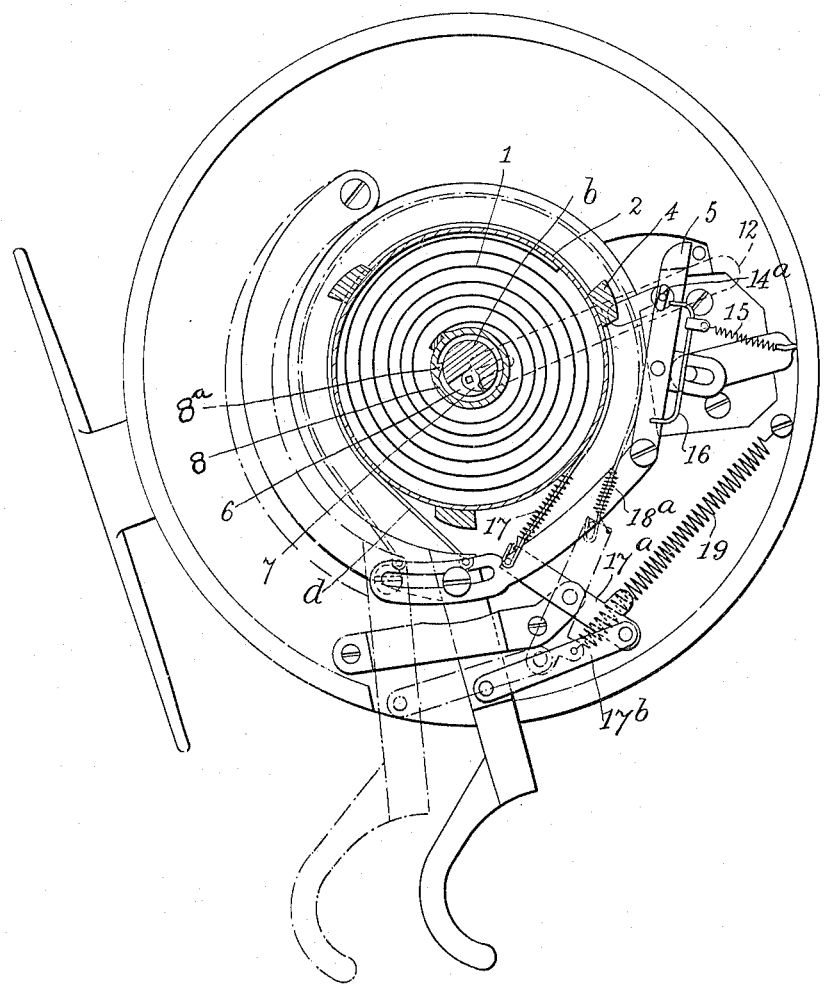

UNITED STATES PATENT OFFICE.

ALFONSO GEORGE LAVERTINE, OF ACTON, LONDON, ENGLAND.

FISHING-REEL.

1,123,764.

Specification of Letters Patent.

Patented Jan. 5, 1915.

Application filed January 27, 1914. Serial No. 814,708.

*To all whom it may concern:*

Be it known that I, ALFONSO GEORGE LAVERTINE, a subject of the King of Great Britain, residing at 85 Avenue road, Acton, London, in the county of Middlesex, England, engineer, have invented a new and useful Improvement in and Relating to Fishing-Reels, of which the following is a specification.

My invention relates to the reels or winches used by fishermen and attached to fishing rods, upon which reels or winches the line is wound or unwound as may be desired.

In such reels or winches as hitherto constructed, when it is desired to make a "cast" or throw out a length of line to which the bait is attached, it is necessary to unwind a length of the line approximating to the distance to which the cast is made, as otherwise the friction upon the unwinding reel will materially retard the force of the cast and lessen the distance thrown. This is a great objection as the line unwound is liable to become entangled and it is difficult to control the loose line.

The object of my invention is to overcome these objections and at the same time to have a perfectly free reel upon which the line can be wound or unwound as desired, while when required the reel can be driven to a greater or less extent in the direction in which the line is being drawn off and at the same speed with practically no friction, and the full length of the cast is thus insured while overrunning is prevented by the application of a brake.

Figure 1:
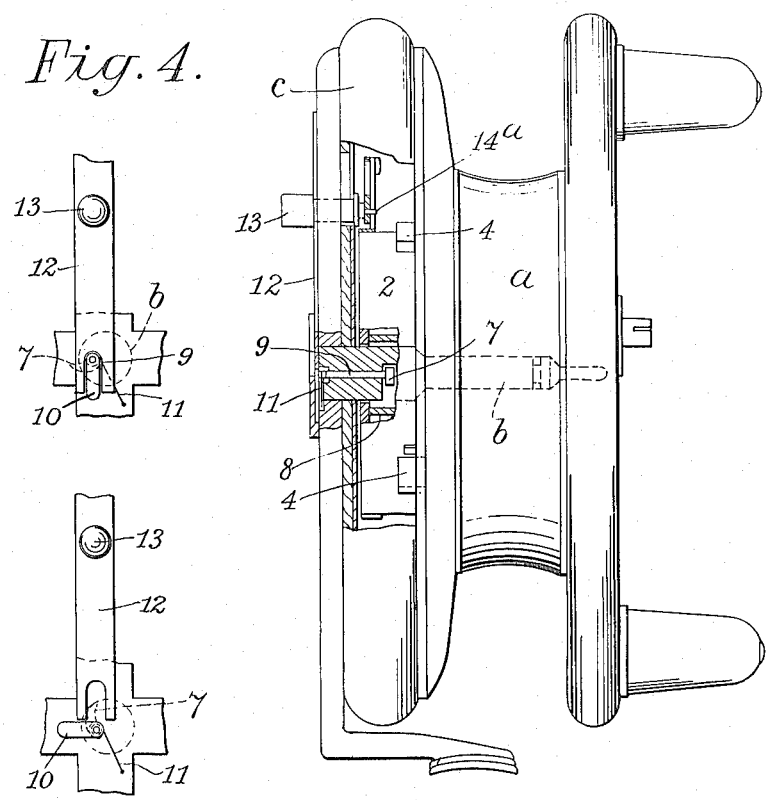
Figure 2:
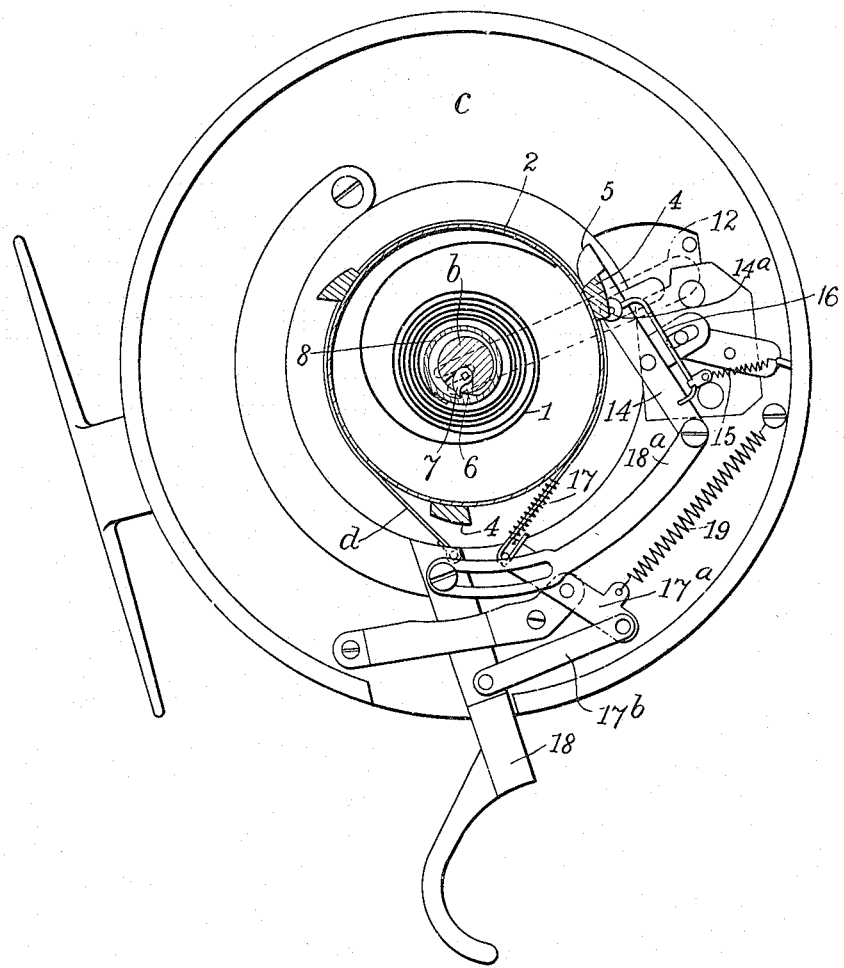

In the accompanying drawings, which illustrate a reel constructed according to this invention:—Figure 1 is a view of the reel in side elevation with a part of the reel broken away to show the internal mechanism. Fig. 2 is a plan view of the internal mechanism of the reel. Fig. 3 is a view similar to Fig. 2 and shows another portion of the mechanism, and Figs. 4 and 5 are views of a detail of construction hereinafter described.

In carrying out my invention I attach to the revolving portion or spool $a$ of the reel and centrally situated so that the spindle $b$ upon which it revolves will pass through its center a spiral spring 1 of sufficient strength to rotate the spool. This spring is housed within a casing 2 the outer periphery of which acts as a drum upon which a band brake $d$ hereinafter described can operate. Upon the drum are also fixed a number (preferably three) of lugs or projections 4, one of which is engaged by a spring pawl or detent 5 after the spring 1 has been wound to prevent rotation of the spool.

The spindle or axis $b$ upon which the reel $a$ revolves is attached to the fixed portion $c$ of the reel and is constructed with a recess 6 into which is fitted a spring controlled projection or pawl 7, which latter, when caused to protrude from its recess in the spindle $b$ will engage with a corresponding slot in one end of the spiral spring 1 or with a sleeve 8 to which one end of the spring is attached, the other end of the spring being secured to the periphery of the case 2 in which the spring is contained. The projection 7 serves to hold the inner end of the spring 1 while the latter is being wound and is under tension. After the spring has been wound its outer end is held against rotation by the spring pawl 5 engaging one of the lugs 4. If the spring pawl 5 be now released from the lug 4, the reel will be revolved upon its axis by the spring 1. When the tension of the spring 1 is relaxed the projection 7 upon the spindle $b$ is returned to its recess in the manner hereinafter described and the reel is free to continue to revolve; but in order to prevent its overrunning or unwinding too great a length of line wound upon it the band brake $d$ is applied to the drum of the spring case 2.

In order to connect the spring 1 with the spindle $b$ the pawl or projection 7 is mounted at the one end of a short spindle 9 the opposite end of which is provided with an arm 10 controlled by a spring 11 and operated by a slide 12. This slide is furnished with a knob 13 and is mounted upon the outer side of the fixed portion $c$ of the reel in such a manner that when depressed its lower end engages with the arm 10 and turns the spindle 9 connected with the projection 7 which works in the spindle $b$ of the reel, the projection 7 being thereby caused to protrude from its recess. During the downward movement of the slide 12 the upper end of the latter operates a lever 14 which is pivotally mounted upon the inner face of the fixed portion c of the reel and which is provided with the pawl 5 for retaining the reel in position against the tension of the spring. Thus, by a single movement of the slide 12 the pawl 5 is placed in position to be engaged by the lugs 4 on the drum 2, while the pawl 7 in the spindle b is projected and engages the lug or projection 8ª on the inner surface of the sleeve 8 to which one end of the spring 1 is attached, thereby holding the inner end of the spring 1 to permit of the latter being wound: a pivotally connected spring 15 retains the pawl lever 14 in its operative position, and by arranging the lower end of this spring to slide upon a bar 16 it also holds the pawl 5 out of position when the spring 1 has been released.

A controlling lever 18 projects through the case of the fixed portion c of the reel and has attached thereto one end of the brake band d, the opposite end of which latter is provided with a coil spring 17 having one of its ends attached to said band and its opposite end attached to a pivoted lever 17ª which is attached by means of a link 17ᵇ with the controlling lever 18. This controlling lever is also connected by means of a link 18ª with the lever 14 whereon is mounted the pawl 5 which holds the drum 2; the lever 14 being in turn connected by a pin 14ª with the slide 12 which actuates the pawl 7 pertaining to the inner end of the spring 1. When the controlling lever 18 is moved into the position shown in dotted lines in Fig. 3 it releases the brake band d from the drum 2, and raises the pawl 5, whereupon the spool a is caused to rotate upon its spindle b under the influence of the spring 1. This spring when relaxed overrides the pawl 7 and causes it to return to its recess where it is held by the spring 11. The movement last described of the lever 18 is effected when making a "cast", the result being that the spool a is driven by the spring 1 during the unwinding of the line and rotates at a speed which is approximately the speed of travel of the line.

To prevent the line overrunning, the lever 18 is released and moves into the position shown in full lines in Fig. 3. While moving into this position the band-brake d is applied first gradually by the spring 17 and then with greater pressure by the spring 19, thus gradually retarding the rotation of the spool a.

Upon releasing the lever 18 the band brake d returns to its operative position upon the drum and remains so until the lever is again depressed owing to the pawls 5 and 7 being now out of engagement respectively with the drum 2 and the spring 1, the lever 18 is free to operate the brake band d, and the spool a may be rotated freely in either direction to wind or unwind the line. When the slide 12 is again depressed the spindle projection 7 and the pawl 5 are placed in position for effecting the winding of the spring 1.

What I claim as my invention and desire to secure by Letters Patent, is:—

1. In a fishing reel, the combination of a spindle, a spool mounted thereon, provided with a spring, adopted to be wound by rotation of the spool and to be unwound so as to freely rotate the spool upon said spindle in an outrunning direction, substantially as described.

2. In a fishing reel, the combination of a fixed spindle, a spool mounted thereon, a spring within said spool, adopted to be wound by rotation of the spool and to be unwound so as to freely rotate the spool upon said spindle, in an outrunning direction, a brake band provided with a coil spring for gradually controlling the rotation of said spool and means for releasing said spool to operate the spring, substantially as described.

3. In a fishing reel, the combination of a spool, a spindle on which said spool rotates freely, a spiral spring the outer end of which is fixed to said spool, a sleeve mounted on said spindle provided with means for securing the inner end of said spring, a pawl pivotally mounted in a recess in said spindle, to engage a lug within said sleeve to prevent rotation of said sleeve during winding of spring, a second pawl for preventing rotation of spool when spring is wound, means for simultaneously engaging said pawls, and means for actuating said second pawl to release said spool to operate the spring, substantially as described.

4. A fishing reel comprising a spool, a spindle on which said spool rotates freely, a casing on said spool and forming a brake drum, a spiral spring housed in said casing and having one end thereof fixed to said casing, a brake band embracing said casing, a sleeve mounted on the spindle provided with means for securing the inner end of said spring, a controlling lever to which said brake band is attached, a pawl pivotally mounted in said spindle and capable of engaging with the inner end of said spiral spring a second pawl for preventing the rotation of said spool when said spring is wound, and means connecting the second pawl with the said controlling lever.

5. In a fishing reel, the combination with a rotatable spool, of a brake drum mounted on said spool, a spiral spring the outer end of which is attached to said spool, a sleeve mounted on the spindle provided with means for securing the inner end of said spring, means for holding and releasing the inner end of said spring, a pawl engaging and disengaging said drum, a controlling lever, a link connecting said pawl to said controlling lever, a pivoted lever connected to said controlling lever, a brake band one end of which is attached to said controlling lever while the other end thereof is flexibly attached to said pivoted lever, a spring controlling said pawl, and a spring controlling said pivoted lever.

In witness whereof I have hereunto set my hand in the presence of two witnesses.

ALFONSO GEORGE LAVERTINE.

Witnesses:
I. K. BOYLE,
E. L. H. ELIOT.